United States Patent
White et al.

(10) Patent No.: US 7,796,537 B2
(45) Date of Patent: Sep. 14, 2010

(54) CREATING NON-TRANSIT NODES IN A LINK NETWORK

(75) Inventors: Russell White, Holly Springs, NC (US); Yi Yang, Morrisville, NC (US); James Ng, Mebane, NC (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 11/736,563

(22) Filed: Apr. 17, 2007

(65) Prior Publication Data

US 2008/0259820 A1    Oct. 23, 2008

(51) Int. Cl.
*H04L 12/28* (2006.01)
*G06F 15/177* (2006.01)

(52) U.S. Cl. .................. 370/254; 370/255; 370/258; 370/389; 709/220; 709/222

(58) Field of Classification Search ......... 370/254–258; 709/220–222
See application file for complete search history.

(56) References Cited

U.S. PATENT DOCUMENTS

| | | | | |
|---|---|---|---|---|
| 2003/0058804 A1* | 3/2003 | Saleh et al. | ............... | 370/254 |
| 2003/0072485 A1* | 4/2003 | Guerin et al. | ............... | 382/166 |
| 2003/0218982 A1* | 11/2003 | Folkes et al. | ............... | 370/238 |
| 2004/0018839 A1* | 1/2004 | Andric et al. | ............... | 455/433 |
| 2004/0132451 A1* | 7/2004 | Butehorn et al. | ............. | 455/445 |
| 2005/0025059 A1* | 2/2005 | Rajan et al. | ................. | 370/238 |
| 2005/0135234 A1* | 6/2005 | Saleh et al. | ................. | 370/218 |
| 2005/0237948 A1* | 10/2005 | Wan et al. | .................... | 370/254 |
| 2005/0259571 A1* | 11/2005 | Battou | ....................... | 370/217 |
| 2006/0092940 A1* | 5/2006 | Ansari et al. | ................ | 370/392 |
| 2007/0025346 A1* | 2/2007 | Kecskemeti | ................. | 370/389 |
| 2007/0097880 A1* | 5/2007 | Rajsic | ........................ | 370/254 |
| 2007/0165543 A1* | 7/2007 | Joo | ............................ | 370/254 |

OTHER PUBLICATIONS

A. Retana, OSPF Stub Router Advertisement, Jun. 2001, IETF, RFC 3137 pp. 1-5.*
Cisco Systems, Inc., EIGRP Stub Routing, /product/software/ios120/120newft/120limit/120s/120s15/eigrpstb.pdf, Jan. 1, 2001, p. 11pp, Volume/univercd/cc/td/doc/, Publisher: Cisco Ssytems, Inc. cisco.com, Published in: San Jose, California INTERNET.

* cited by examiner

*Primary Examiner*—Huy D Vu
*Assistant Examiner*—Brandon Renner
(74) *Attorney, Agent, or Firm*—Patent Capital Group

(57) ABSTRACT

In one embodiment, a method includes receiving a first link state initiation (HELLO) message from a first neighboring router. The HELLO message requests that a recipient node send a unique identifier for itself in a link state routing protocol. In response to receiving the first HELLO message, a first response message is sent that includes a first identifier from an identifier pool. The identifier pool contains for a local node a plurality of network identifiers that are unique among all nodes in the network that uses the link state routing protocol. A second HELLO message is received from a different second neighboring router. In response to receiving the second HELLO message, a second response message is sent that includes a different second identifier from the identifier pool.

20 Claims, 4 Drawing Sheets

CREATING NON-TRANSIT NODES IN A LINK NETWORK

BACKGROUND OF THE INVENTION

1. Field of the Invention

The present invention relates to sharing routing information in a link state routing protocol.

2. Description of the Related Art

Networks of general purpose computer systems and specialized devices connected by external communication links are well known and widely used in commerce. The networks often include one or more network devices that facilitate the passage of information between the computer systems and devices. A network node is a network device or computer or specialized device connected by the communication links. An end node is a node that is configured to originate or terminate communications over the network. An intermediate network node facilitates the passage of data between end nodes.

A link-state protocol floods routing information to all intermediate network nodes on a sub-network in a link-state protocol control plane data packet. Each node sends only the portion of the routing information that describes the state of its own links. Link-state data indicates direct links between an intermediate network node that performs routing functions (a router) and a different neighboring router (a router on the same network segment, which does not involve an intervening third router). The link-state data also indicates other characteristics of those links, such as bandwidth and congestion. According to link-state methods, each router builds a model of the entire network based on the link-state data received from other routers in the same.

In some network designs, it is desirable to configure edge routers connected to end nodes so that other routers in the network will not use the edge router as a next hop towards any destination other than those end nodes. An edge router so configured is called a non-transit router or a stub router. Configuring a stub router has been accomplished using a distance vector protocol, which summarizes routing information before passing such information along to a neighboring router. Example distance vector protocols include the routing information protocol (RIP) and the enhanced interior gateway routing protocol (EIGRP) of CISCO SYSTEMS, INC,™ of San Jose Calif.

However, techniques used in distance vector protocols do not work when using a link state protocol, because each node in a link state protocol builds its own model of the entire sub-network that uses the link state protocol. Furthermore, modifications to the link state protocol used on all other routers in the sub-network is not desirable because there are a large number of such routers already deployed.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF EXAMPLE EMBODIMENTS

Techniques are described for creating a non-transit router in a link state protocol. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Descriptions of the invention provided below are given in the context of stub routers for the Open Shortest Path First (OSPF) protocol implemented in a private enterprise network; however, the invention is not limited to this context. In other contexts, the same or other link state protocols are used in the same or different networks with non-transit routers deployed in the same or different arrangement.

1.0 Overview

According to one set of embodiments, a method includes receiving, at a local node, a first link state initiation (HELLO) message from a first neighboring router. The HELLO message requests a recipient node send a unique identifier for the recipient node in a link state routing protocol. In response to receiving the first HELLO message, a first response message is sent that includes data that indicates a first identifier from an identifier pool. The identifier pool contains for a local node a plurality of network identifiers that are unique among all nodes in a network that uses the link state routing protocol. A second HELLO message is received from a different second neighboring router. In response to receiving the second HELLO message, a second response message is sent that includes data that indicates a different second identifier from the identifier pool.

In various other embodiments, an apparatus or a tangible medium or compute readable medium is configured to perform one or more steps of the above method.

2.0 Network with Non-Transit Router

Communications between nodes are typically effected by exchanging discrete packets of data. Information is exchanged within data packets according to one or more of many well known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The usually higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled *Interconnections Second Edition*, by Radia Perlman, published September 1999, which is hereby incorporated by reference as though fully set forth herein.

The data-link header provides information defining a particular communication link between one network node and an adjacent node. The internetwork header provides information defining the source and destination address within the computer network. Notably, the path may span multiple physical links. The internetwork header may be formatted according to the Internet Protocol (IP), which specifies IP addresses of both a source and destination node at the end points of the logical path. Thus, the packet may "hop" from node to node along its logical path until it reaches the end node assigned to the destination IP address stored in the packet's internetwork header. After each hop, the source or destination addresses in the packet's data-link header may be updated, as necessary. However, the source and destination IP addresses typically remain unchanged as the packet is transferred from link to link in the network.

Routers and switches are network devices that determine which communication link or links to employ to support the progress of data packets through the network. A network node that determines which links to employ based on information in the internetwork header (layer 3) is called a router. Some protocols pass protocol-related information among two or more network nodes in special control packets that are communicated separately and which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications.

An open shortest path first (OSPF) protocol implements a shortest path first algorithm (also known as the Dijkstra algorithm) that is widely known in the art for routing IP data packets on some networks. This protocol is described in an Internet Engineering Task Force (IETF) Request For Comment (RFC) 2328, the entire contents of which are hereby incorporated by reference as if fully set forth herein. RFC 2328 is available at the ietf.org domain of the World Wide Web. The OSPF protocol is a link-state protocol.

A link-state protocol is an example of a routing protocol, which only exchanges control plane messages used for routing data packets sent in a different routed protocol (e.g., IP). In a link-state protocol, two routers establish an adjacency relationship between them by first verifying direct two-way communication between them over the same network segment by exchanging link state initiation messages and then synchronizing their link-state databases by exchanging update messages. Once the adjacency relationship is established, the two routers are called peers. The peers announce their adjacency relationship in periodic messages to other nodes in the network. For example, in the Open Shortest Path First (OSPF) protocol, the adjacency relationships are advertised Link-state Advertisement (LSA) messages sent among nodes within a partitioned area of a larger network. The adjacency relationships among peers are used in all shortest path first computations by all routers in the partitioned area of the larger network. During a reliable flooding stage, each router is required to ensure that each of its peers has received its link-state data through a mechanism that includes an acknowledgement message and, sometimes, a retransmission message.

Maintaining an adjacency relationship with a peer provides the benefit of reaching network nodes connected more directly to that peer than to the router itself. Additional peers provide redundant paths to some network nodes and thus provide increased network reliability.

As mentioned in the previous section, it is sometimes desirable to configure an edge router that is connected to a local area network (LAN) of end nodes as a non-transit (stub) router. For example, a stub router can have much reduced functionality and therefore can be built with less expensive, less capable components. Its limited capability would be overwhelmed if it were used as a hop in high bandwidth traffic between much more expensive and more capable routers.

Figure 1A:
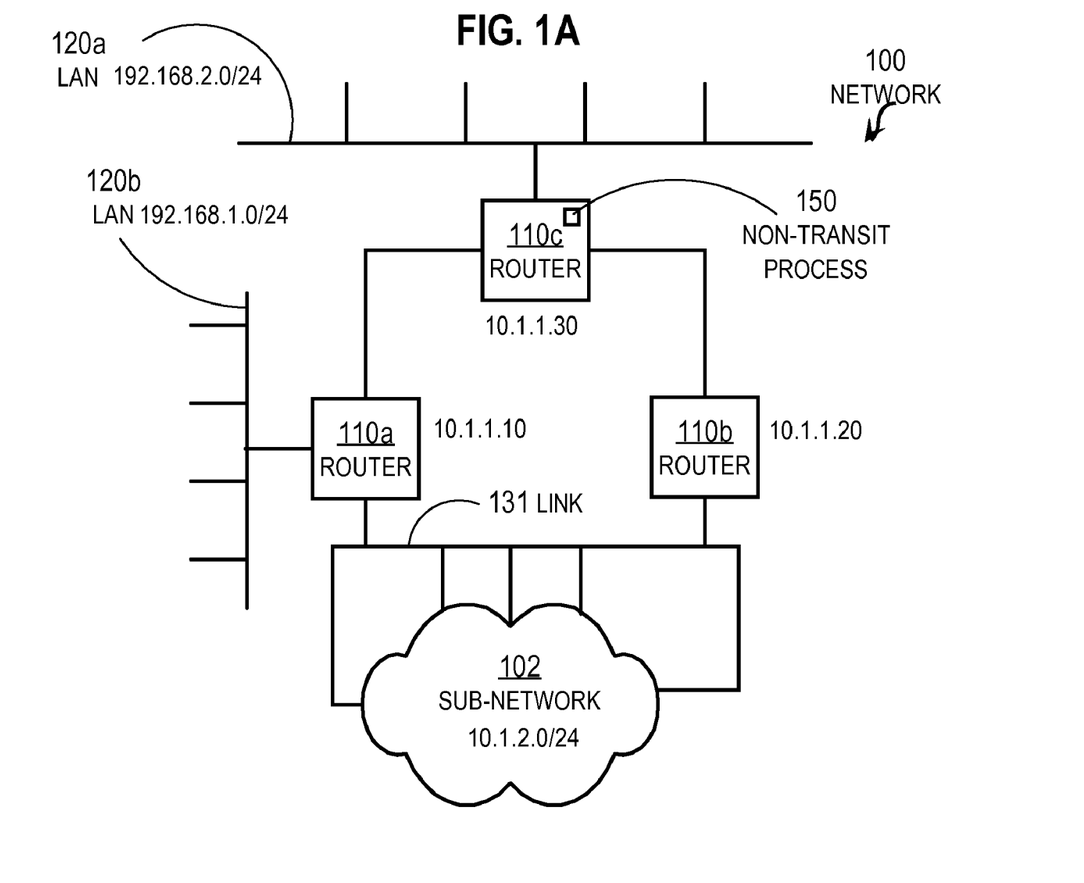
FIG. 1A illustrates a first example network with a non-transit router.

FIG. 1A illustrates a first example network 100 with a non-transit router. Network 100 includes enterprise sub-network 102, router 110*a*, router 110*b* and router 110*c*, local area network (LAN) 120*a* and LAN 120*b*. Router 110*a*, router 110*b*, router 110*c* and other routers (not shown) in sub-network 102 are collectively termed hereinafter routers 110. LAN 120*a*, LAN 120*b* and other LAN (not shown) in sub-network 102 are collectively termed hereinafter LAN 120. Multiple end nodes (not shown) are connected to router 110*a* and router 110*c* vie LAN 120*b* and LAN 120*a*, respectively. Routers 110 are connected to each other and to various LAN 120 in and out of subnetwork 102 by segment links, including segment link 131 connecting router 110*a* directly to router 110*b*.

It is further assumed, for purposes of illustration, that the routers and end nodes have the illustrated Internet Protocol (IP) addresses. IP version 4 addresses are made up of four octets of eight binary digits (bits). Each octet represents a decimal value from 0 through 255, so an IP address is expressed as four decimal values in the range from 0 through 255, separated by dots. A contiguous set of IP addresses have the same leading bits, called a mask, and is expressed by a base address followed by a slash and the mask size. In the illustrated embodiment, router 110*a* has the IP address 10.1.1.10, router 110*b* has the IP address 10.1.1.20 and router 110*c* has the IP address 10.1.1.30. Other nodes in sub-network 102 have addresses in the range 10.1.2.0/24. LAN 120*a* includes nodes with addresses in the address range 192.168.2.0/24 and LAN 120*b* includes nodes with addresses in the address range 192.168.1.0/24.

It is assumed for purpose of illustration, that LAN 120*a* includes multiple low capacity end nodes for use by a few individuals of an enterprise, such as those on a single floor of a single building occupied by the enterprise. It is further assumed that LAN 120*b* is connected to multiple high powered servers that provide services for all employees and customers of the enterprise that connect to sub-network 102.

In such a circumstance it is desirable that router 110*a* be an expensive, high capacity router and that router 110*c* be an inexpensive, low capacity router. High capacity router 110*a* may also be connected to multiple other low capacity routers (not shown) like router 110*c*. Such a high capacity router connected to several low capacity routers is sometimes called a distribution router.

In the illustrated embodiment, low capacity router 110*c* is also connected directly to router 110*b*. It is assumed for purposes of illustration that router 110*b* is also a high capacity router. For example, router 110*b* is a backup distribution router for another distribution router (e.g., router 110*a*) connected to multiple low capacity routers (not shown), including low capacity router 110*c*. It is further assumed that many routers in sub-network 102 are also high capacity routers.

A problem arises, in such an arrangement of routers, when an unmodified link state protocol is used to distribute routing information among routers 110. If link 131 between router 110*a* and router 110*b* is broken or otherwise unavailable, the high capacity routers 110*a*, 110*b* may attempt to communicate via low capacity router 110*c*, rather than through one or more other high capacity routers in sub-network 102. High capacity traffic, such as utilized by servers on LAN 120*b* may overwhelm low capacity router 110*c* and cause this node to fail, blocking the connections between LAN 120*a* and services on LAN 120*b* and sub-network 102.

According to an illustrated embodiment, a non-transit process 150 executes on router 110*c* to cause router 110*c* to become a stub router that is not used for any traffic except traffic involving LAN 120*a*.

In network 100, one network interface on low capacity router 110*c* is connected to high capacity router 110*a* and a different network interface is connected to high capacity router 110*b*.

Figure 1B:
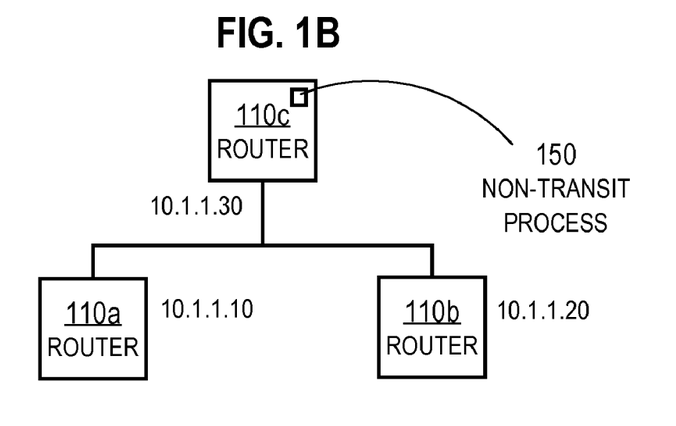
FIG. 1B illustrates a portion of a second example network with a non-transit router.

FIG. 1B illustrates a portion of a second example network with a non-transit router. The second network is like the first network 100, except that high capacity router 110*a* and high capacity router 110*b* are connected to low capacity router 110*c* through the same network interface on router 110*c*.

In the networks of FIG. 1A and FIG. 1B, the router 110*c* responds to OSPF HELLO messages with a response message that includes an identifier for itself, such as its IP address 10.1.1.30. Thus router 110*a* and router 110*b* each learn it is connected to router with identifier 10.1.1.30. When link state information is exchanged in one or more update messages, router 110*a* learns that the router with ID 10.1.1.30 is connected to router 110*b*; and router 110*b* learns that the router with ID 10.1.1.30 is connected to router 110*a*. The OSPF algorithm determines that the best route between router 110*a* and 110*b* is link 131; but if link 131 becomes unavailable, the next best route may be through the router with identifier 10.1.1.30. For purposes of illustration, it is assumed that this is the case, i.e., link 131 becomes unavailable and the best path is through the router with identifier 10.1.1.30. Router 110*c* then becomes an unwitting and unwilling router for the high volume traffic from sub-network 102 and router 110*b* to reach router 110*a*, and back.

According to the illustrated embodiment, process 150 causes router 110*c* to respond to a HELLO message from router 110*a* with one identifier and responds to a HELLO message from router 110*b* with a different identifier. Furthermore, router 110*c* does not advertise to router 110*a* that router 110*c* has a connection to the router with the different identifier or a connection to router 110*b*. Similarly, router 110*c* does not advertise to router 110*b* that router 110*c* has a connection to the router with the first identifier or a connection to router 110*a*.

Figure 2A:
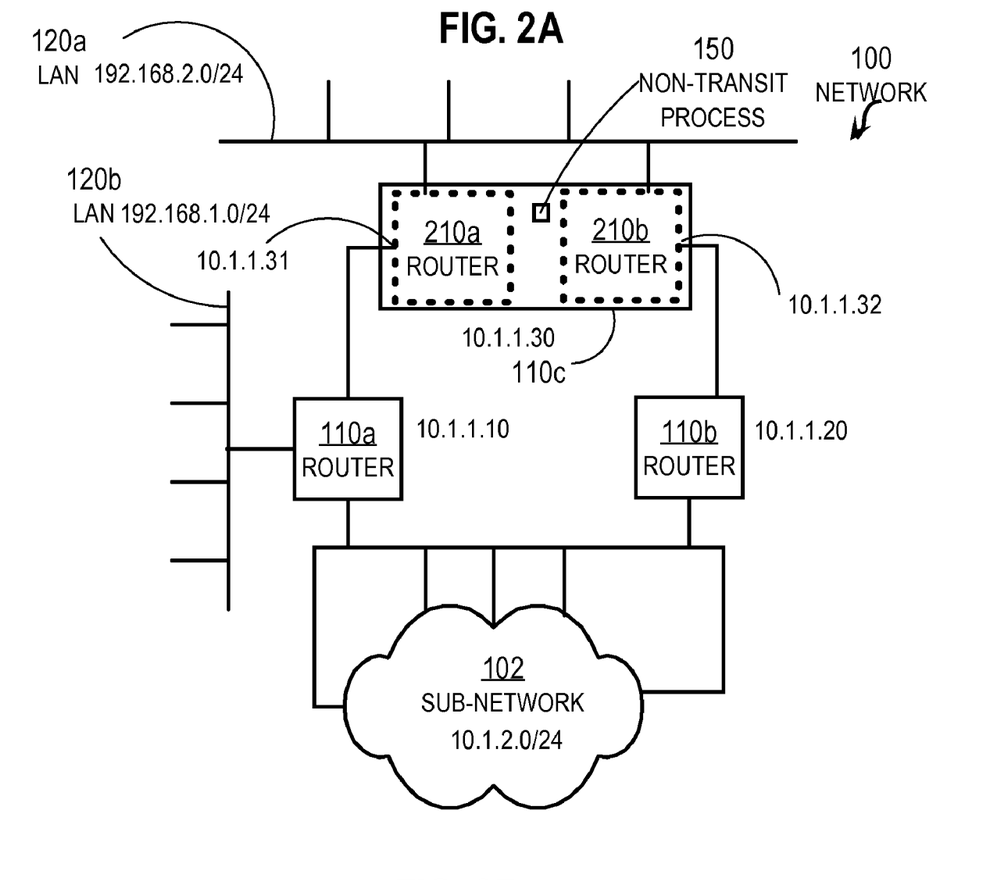
FIG. 2A illustrates the example network of FIG. 1A as represented by the non-transit router to other routers.

FIG. 2A illustrates the example network 100 of FIG. 1A as represented by the non-transit router to other routers. In this example, the non-transit process 150 on router 110*c* has access to a pool of IP addresses for itself (e.g., a loop-back IP address, 10.1.1.30), and for each of its interfaces (e.g., 10.1.1.31 and 10.1.1.32).

The non-transit process 150 responds to a HELLO from router 110*a* with one IP address, e.g., the IP address of the interface 10.1.1.31 connected to the neighboring router 110*a* that sent the HELLO message. The non-transit process 150 responds to a HELLO from router 110*b* with a different IP address, e.g., the IP address of the interface 10.1.1.32 connected to the neighboring router 110*b* that sent the HELLO message. Updates sent to router 110*a* shows reachability to addresses 192.168.2.0/24 on LAN 120*a* but no connections to router with ID 10.1.1.32 or router 110*b* with IP address 10.1.1.20. Updates sent to router 110*b* shows reachability to addresses 192.168.2.0/24 on LAN 120*a* but no connections to router with ID 10.1.1.31 or router 110*a* with IP address 10.1.1.10.

Thus the model of the network constructed by routers 110*a* and 110*b* and promulgated throughout network 102 is as shown in FIG. 2A. There appears to be a router 210*a* with IP address 10.1.1.31 connected to LAN 120*a* and a separate router 210*b* with IP address 10.1.1.32 also connected to LAN 120*a*. Routers 210*a* and 210*b* do not appear to be connected to each other, and no route is offered between routers 110*a* and 110*b* through routers 210*a* and 210*b*. Thus high throughput traffic to and from high capacity router 110*a* will not be sent by high capacity router 110*b* though low capacity router 110*a*. Instead, some path through sub-network 102 will be utilized.

Figure 2B:
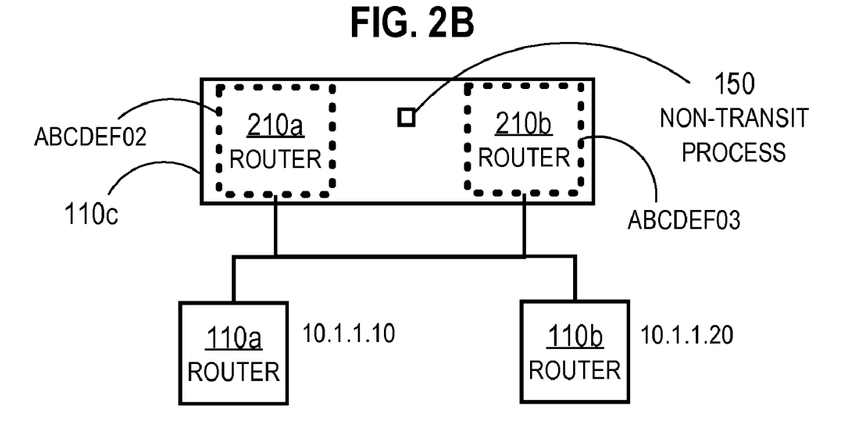
FIG. 2B illustrates the portion of FIG. 1B as represented by the non-transit router to the other routers.

FIG. 2B illustrates the portion of FIG. 1B as represented by the non-transit router to the other routers. In this case, there is one network interface on router 110*c*, which is connected to both high capacity routers 110*a* and 110*b*. Since the same interface has the same IP address, the IP address is not used in this case. Instead another router identifier is used. For example, in OSPF each router is configured with a unique 32 bit router ID. To distinguish these 32 bit router IDs from the 32 bit IP addresses, the 32 bit router ID is indicated herein by four pairs of hexadecimal digits. A hexadecimal digit is four bits and represents decimal numbers from 0 through 15, which is indicated by the decimal digits for 0 through 9 and by the letters A through F for the decimal values 10 though 15. In this terminology the router ID for router 110*c* is assumed to be expressed as ABCDEF01.

According to an embodiment, router 110*c* is configured with multiple router IDs. It is assumed for purposes of illustration that router 110*c* is configured with the router IDs ABCDEF02 and ABCDEF03.

The non-transit process 150 responds to a HELLO from router 110*a* with one router ID, e.g., ABCDEF02. The non-transit process 150 responds to a HELLO from router 110*b* with a different router ID, e.g., ABCDEF03. Updates sent to router 110*a* shows reachability to addresses 192.168.2.0/24 on LAN 120*a* but no connections to router with ID ABCDEF03 or router 110*b* with IP address 10.1.1.20. Updates sent to router 110*b* shows reachability to addresses 192.168.2.0/24 on LAN 120*a* but no connections to router with ID ABCDEF02 or router 110*a* with IP address 10.1.1.10.

Thus the model of the portion of network 100 depicted in FIG. 1B and constructed by routers 110*a* and 110*b* and promulgated throughout network 102 is as shown in FIG. 2B. There appears to be a router 210*a* with ID ABCDEF02 connected to LAN 120*a* and a separate router 210*b* with router ID ABCDEF03 also connected to LAN 120*a*. Routers 210*a* and 210*b* do not appear to be connected to each other, and no route is offered between routers 110*a* and 110*b* through routers 210*a* and 210*b*. Thus high throughput traffic to and from high capacity router 110*a* will not be sent by high capacity router 110*b* though low capacity router 110*c*.

3.0 Method

Figure 3:
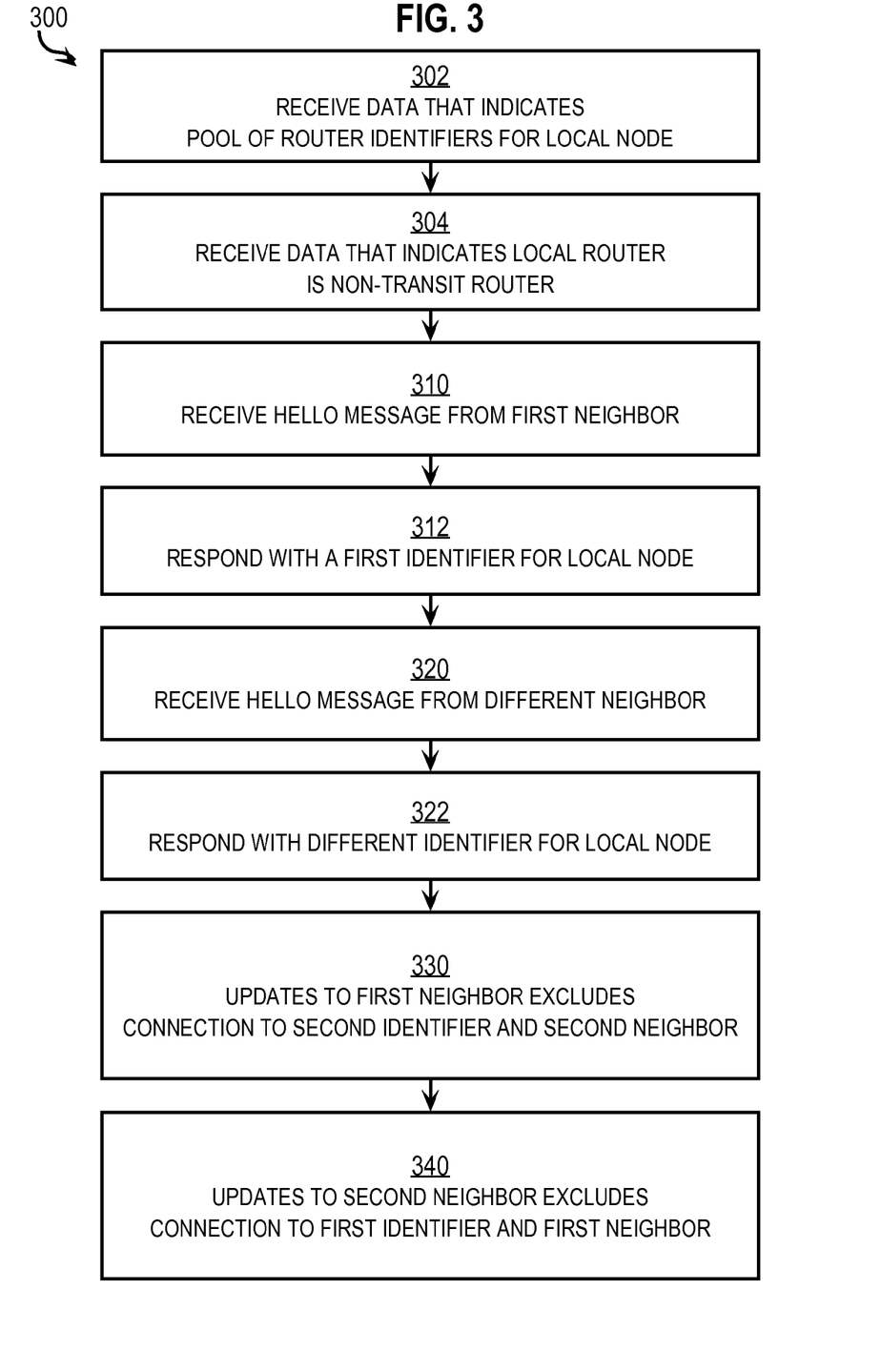
FIG. 3 illustrates at a high level an example method implemented at the non-transit router.

FIG. 3 illustrates at a high level an example method 300 implemented in the non-transit process at a router. Although steps in FIG. 3 are show in a particular order for purposes of illustration, in other embodiments, one or more steps may be performed in a different order or overlapping in time, in series or in parallel, or one or more steps may be omitted or added, or changed in some combination of ways.

In step 302 data is received that indicates a pool of router identifiers for a local node. Any method may be used to receive this data. For example, in various embodiments, the data is included as a default value in software instructions, is received as manual input from a network administrator on the local or a remote node, is retrieved from a local file or database, or is sent from a different node on the network, either in response to a query or unsolicited, or the data is received using some combination of these methods. In an illustrated embodiment, a pool of multiple router IDs is manually configured. In some of these embodiments, the pool of network identifiers includes multiple router identifiers configured for the OSPF routing protocol. In some of these embodiments, the pool of network identifiers includes multiple router loopback identifiers configured for an Intermediate System to Intermediate System (IS-IS) link state routing protocol. In some embodiments, a pool of multiple interface and loopback IP addresses are dynamically configured, e.g., by a Dynamic Host Configuration Protocol (DHCP) server.

In step 304, data is received that indicates the local router is a non-transit router. Any method may be used to receive this data. For example, in some embodiments, the information is a default value in software installed from read-only memory (ROM) when the local node is powered up. In some embodiments, the information is a default value embedded in a hardware chip that implements the non-transit router. In some embodiments, this data is manually configured. In some embodiments a router is built as a non-transit router with no option to be used as a transiting router, and step 304 is omitted.

In step 310, a link state initiation message, such as an OSPF HELLO message, is received from a first neighboring router (called, simply, a neighbor hereinafter). For simplicity the link state initiation message is called a HELLO message herein, even if the link state protocol is not OSPF. The link state initiation message requests a recipient node that receives the message to send a unique identifier among nodes using a link state routing protocol.

In step 312, the local node responds by sending a response message to the sender of the HELLO message in step 310. This response includes data that indicates a first identifier from the pool received during step 302. The first identifier is different from any identifier previously sent to a node different from the neighbor to which the response message is sent.

In step 320, a HELLO message is received from a different neighbor.

In step 322, the local node responds by sending a response message to the different neighbor that sent the HELLO message in step 320. This response includes data that indicates a second identifier from the pool received during step 302. The second identifier is different from the first identifier and from any identifier previously sent to a node different from the neighbor to which the response message is sent.

In step 330, link state update messages (called simply update messages hereinafter) are sent to the first neighbor. General update messages include data that list the neighbors adjacent to a sending node. The update messages sent to the first neighbor by non-transit process (e.g., process 150) on the local node (e.g., non-transit router 110c), however, do not include data that indicates an adjacency with either the second identifier or another router, including the second neighbor. Only adjacency to non-router nodes are indicated by data sent in the update message to the first neighbor.

In step 340, update messages are sent to the second neighbor. The update messages sent to the second neighbor by non-transit process (e.g., process 150) on the local node (e.g., non-transit router 110c), however, do not include data that indicates an adjacency with either the first identifier or another router, including the first neighbor. Only adjacency to non-router nodes are indicated by data sent in the update message to the second neighbor.

Using the steps of method 300, the non-transit process (e.g., process 150 on router 110c) allows the host router to perform as a stub router that is not subject to forwarding traffic to or through another, possibly more capable, router.

4.0 Implementation Mechanisms—Hardware Overview

Figure 4:
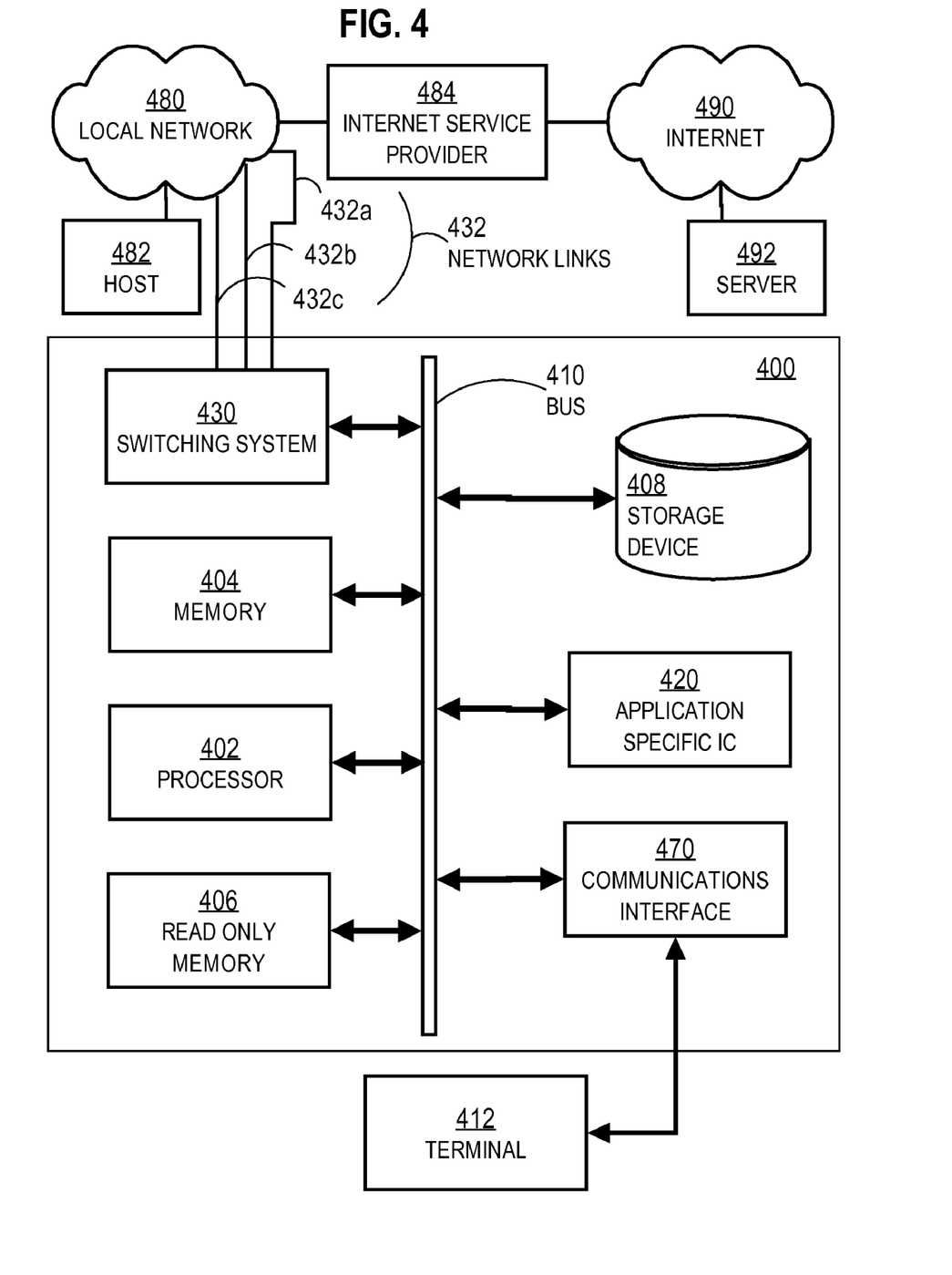
FIG. 4 illustrates a computer system upon which an embodiment of the invention may be implemented.

FIG. 4 illustrates a computer system 400 upon which an embodiment of the invention may be implemented. The preferred embodiment is implemented using one or more computer programs running on a network element such as a router device. Thus, in this embodiment, the computer system 400 is a router.

Computer system 400 includes a communication mechanism such as a bus 410 for passing information between other internal and external components of the computer system 400. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). A sequence of binary digits constitutes digital data that is used to represent a number or code for a character. A bus 410 includes many parallel conductors of information so that information is transferred quickly among devices coupled to the bus 410. One or more processors 402 for processing information are coupled with the bus 410. A processor 402 performs a set of operations on information. The set of operations include bringing information in from the bus 410 and placing information on the bus 410. The set of operations also typically include comparing two or more units of information, shifting positions of units of information, and combining two or more units of information, such as by addition or multiplication. A sequence of operations to be executed by the processor 402 constitute computer instructions.

Computer system 400 also includes a memory 404 coupled to bus 410. The memory 404, such as a random access memory (RAM) or other dynamic storage device, stores information including computer instructions. Dynamic memory allows information stored therein to be changed by the computer system 400. RAM allows a unit of information stored at a location called a memory address to be stored and retrieved independently of information at neighboring addresses. The memory 404 is also used by the processor 402 to store temporary values during execution of computer instructions. The computer system 400 also includes a read only memory (ROM) 406 or other static storage device coupled to the bus 410 for storing static information, including instructions, that is not changed by the computer system 400. Also coupled to bus 410 is a non-volatile (persistent) storage device 408, such as a magnetic disk or optical disk, for storing information, including instructions, that persists even when the computer system 400 is turned off or otherwise loses power.

The term computer-readable medium is used herein to refer to any medium that participates in providing information to processor 402, including instructions for execution. Such a medium may take many forms, including, but not limited to, non-volatile media, volatile media and transmission media. Non-volatile media include, for example, optical or magnetic disks, such as storage device 408. Volatile media include, for example, dynamic memory 404. Transmission media include, for example, coaxial cables, copper wire, fiber optic cables, and waves that travel through space without wires or cables, such as acoustic waves and electromagnetic waves, including radio, optical and infrared waves. Signals that are transmitted over transmission media are herein called carrier waves.

Common forms of computer-readable media include, for example, a floppy disk, a flexible disk, a hard disk, a magnetic tape or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read.

Information, including instructions, is provided to the bus 410 for use by the processor from an external terminal 412, such as a terminal with a keyboard containing alphanumeric keys operated by a human user, or a sensor. A sensor detects conditions in its vicinity and transforms those detections into signals compatible with the signals used to represent information in computer system 400. Other external components of terminal 412 coupled to bus 410, used primarily for interacting with humans, include a display device, such as a cathode ray tube (CRT) or a liquid crystal display (LCD) or a plasma screen, for presenting images, and a pointing device, such as a mouse or a trackball or cursor direction keys, for controlling a position of a small cursor image presented on the display and issuing commands associated with graphical elements presented on the display of terminal 412. In some embodiments, terminal 412 is omitted.

Computer system 400 also includes one or more instances of a communications interface 470 coupled to bus 410. Communication interface 470 provides a two-way communication coupling to a variety of external devices that operate with their own processors, such as printers, scanners, external disks, and terminal 412. Firmware or software running in the computer system 400 provides a terminal interface or character-based command interface so that external commands can be given to the computer system. For example, communication interface 470 may be a parallel port or a serial port such as an RS-232 or RS-422 interface, or a universal serial bus (USB) port on a personal computer. In some embodiments, communications interface 470 is an integrated services digital network (ISDN) card or a digital subscriber line (DSL) card or a telephone modem that provides an information communication connection to a corresponding type of telephone line. In some embodiments, a communication interface 470 is a cable modem that converts signals on bus 410 into signals for a communication connection over a coaxial cable or into optical signals for a communication connection over a fiber optic cable. As another example, communications interface 470 may be a local area network (LAN) card to provide a data communication connection to a compatible LAN, such as Ethernet. Wireless links may also be implemented. For wireless links, the communications interface 470 sends and receives electrical, acoustic or electromagnetic signals, including infrared and optical signals, which carry information streams, such as digital data. Such signals are examples of carrier waves In the illustrated embodiment, special purpose hardware, such as an application specific integrated circuit (IC) 420, is coupled to bus 410. The special purpose hardware is configured to perform operations not performed by processor 402 quickly enough for special purposes. Examples of application specific ICs include graphics accelerator cards for generating images for display, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware. Logic encoded in one or more tangible media includes one or both of computer instructions and special purpose hardware.

In the illustrated computer used as a router, the computer system 400 includes switching system 430 as special purpose hardware for switching information for flow over a network. Switching system 430 typically includes multiple communications interfaces, such as communications interface 470, for coupling to multiple other devices. In general, each coupling is with a network link 432 that is connected to another device in or attached to a network, such as local network 480 in the illustrated embodiment, to which a variety of external devices with their own processors are connected. In some embodiments an input interface or an output interface or both are linked to each of one or more external network elements. Although three network links 432a, 432b, 432c are included in network links 432 in the illustrated embodiment, in other embodiments, more or fewer links are connected to switching system 430. Network links 432 typically provides information communication through one or more networks to other devices that use or process the information. For example, network link 432b may provide a connection through local network 480 to a host computer 482 or to equipment 484 operated by an Internet Service Provider (ISP). ISP equipment 484 in turn provides data communication services through the public, world-wide packet-switching communication network of networks now commonly referred to as the Internet 490. A computer called a server 492 connected to the Internet provides a service in response to information received over the Internet. For example, server 492 provides routing information for use with switching system 430.

The switching system 430 includes logic and circuitry configured to perform switching functions associated with passing information among elements of network 480, including passing information received along one network link, e.g. 432a, as output on the same or different network link, e.g., 432c. The switching system 430 switches information traffic arriving on an input interface to an output interface according to pre-determined protocols and conventions that are well known. In some embodiments, switching system 430 includes its own processor and memory to perform some of the switching functions in software. In some embodiments, switching system 430 relies on processor 402, memory 404, ROM 406, storage 408, or some combination, to perform one or more switching functions in software. For example, switching system 430, in cooperation with processor 404 implementing a particular protocol, can determine a destination of a packet of data arriving on input interface on link 432a and send it to the correct destination using output interface on link 432c. The destinations may include host 482, server 492, other terminal devices connected to local network 480 or Internet 490, or other routing and switching devices in local network 480 or Internet 490.

The invention is related to the use of computer system 400 for implementing the techniques described herein. According to one embodiment of the invention, those techniques are performed by computer system 400 in response to processor 402 executing one or more sequences of one or more instructions contained in memory 404. Such instructions, also called software and program code, may be read into memory 404 from another computer-readable medium such as storage device 408. Execution of the sequences of instructions contained in memory 404 causes processor 402 to perform the method steps described herein. In alternative embodiments, hardware, such as application specific integrated circuit 420 and circuits in switching system 430, may be used in place of or in combination with software to implement the invention. Thus, embodiments of the invention are not limited to any specific combination of hardware and software.

The signals transmitted over network link 432 and other networks through communications interfaces such as interface 470, which carry information to and from computer system 400, are example forms of carrier waves. Computer system 400 can send and receive information, including program code, through the networks 480, 490 among others, through network links 432 and communications interfaces such as interface 470. In an example using the Internet 490, a server 492 transmits program code for a particular application, requested by a message sent from computer 400, through Internet 490, ISP equipment 484, local network 480 and network link 432b through communications interface in switching system 430. The received code may be executed by processor 402 or switching system 430 as it is received, or may be stored in storage device 408 or other non-volatile storage for later execution, or both. In this manner, computer system 400 may obtain application program code in the form of a carrier wave.

Various forms of computer readable media may be involved in carrying one or more sequence of instructions or data or both to processor 402 for execution. For example, instructions and data may initially be carried on a magnetic disk of a remote computer such as host 482. The remote computer loads the instructions and data into its dynamic memory and sends the instructions and data over a telephone line using a modem. A modem local to the computer system 400 receives the instructions and data on a telephone line and uses an infra-red transmitter to convert the instructions and data to an infra-red signal, a carrier wave serving as the network link 432b. An infrared detector serving as communications interface in switching system 430 receives the instructions and data carried in the infrared signal and places information representing the instructions and data onto bus 410. Bus 410 carries the information to memory 404 from which processor 402 retrieves and executes the instructions using some of the data sent with the instructions. The instructions and data received in memory 404 may optionally be stored on storage device 408, either before or after execution by the processor 402 or switching system 430.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method comprising:
receiving from a first neighboring router an open shortest path first (OSPF) first link state initiation (HELLO) message that requests a recipient node to send a unique identifier for a link state routing protocol;
in response to receiving the first HELLO message, sending a first response message that includes data that indicates a first identifier from an identifier pool that contains for a local node a plurality of network identifiers that are unique among all nodes in a network that uses the link state routing protocol;
receiving from a different second neighboring router a second HELLO message; and
in response to receiving the second HELLO message, sending a second response message that includes data that indicates a different second identifier from the identifier pool, wherein a first link state update message is provided to the second neighboring router and includes no adjacency information between the first neighboring router and the recipient node, and wherein a second link state update message is provided to the first neighboring router and includes no adjacency information between the second neighboring router and the recipient node, and wherein the first neighboring router, the second neighboring router, and the recipient node are configured to connect to a same local area network and a same domain.

2. A method as recited in claim 1, further comprising sending from the local node no advertisement message that includes link state data that indicates a node with the second identifier is a neighbor of a node with the first identifier.

3. A method as recited in claim 2, said step of sending from the local node no advertisement message that includes link state data that indicates a node with the second identifier is a neighbor of a node with the first identifier further comprising sending no advertisement message that includes link state data that indicates a node with the second identifier is a neighbor of the first neighboring router.

4. A method as recited in claim 2, said step of sending from the local node no advertisement message that includes link state data that indicates a node with the second identifier is a neighbor of a node with the first identifier further comprising sending no advertisement message that includes link state data that indicates a node with the first identifier is a neighbor of the second neighboring router.

5. A method as recited in claim 1, wherein the identifier pool is a plurality of Internet Protocol addresses.

6. A method as recited in claim 1, wherein the identifier pool is a plurality of router identifiers configured for an Open Shortest Path First (OSPF) routing protocol.

7. A method as recited in claim 1, wherein the identifier pool is a plurality of router loop-back identifiers configured for an Intermediate System to Intermediate System (IS-IS) routing protocol.

8. A method as recited in claim 1, further comprising the step of receiving data that indicates the identifier pool.

9. A method as recited in claim 1, wherein there is no intervening intermediate network node between the local node and any neighboring router.

10. An apparatus comprising:
means for receiving from a first neighboring router a an open shortest path first (OSPF) first link state initiation (HELLO) message that requests a recipient node to send a unique identifier for a link state routing protocol;
means for sending a first response message that includes data that indicates a first identifier from an identifier pool that contains for the apparatus a plurality of network identifiers that are unique among all nodes in a network that uses the link state routing protocol in response to receiving the first HELLO message;
means for receiving from a different second neighboring router a second HELLO message; and
means for sending a second response message that includes data that indicates a different second identifier from the identifier pool in response to receiving the second HELLO message, wherein a first link state update message is provided to the second neighboring router and includes no adjacency information between the first neighboring router and the recipient node, and wherein a second link state update message is provided to the first neighboring router and includes no adjacency information between the second neighboring router and the recipient node, and wherein the first neighboring router, the second neighboring router, and the recipient node are configured to connect to a same local area network and a same domain.

11. An apparatus comprising:

a plurality of network interfaces that are each configured for communicating a data packet with a packet-switched network;

logic encoded in one or more tangible media and, when executed, operable for:

receiving through a first network interface of the plurality of network interfaces from a first neighboring router an open shortest path first (OSPF) first link state initiation (HELLO) message that requests a recipient node to send a unique identifier for a link state routing protocol;

in response to receiving the first HELLO message, sending through the first network interface a first response message that includes data that indicates a first identifier from an identifier pool that contains for the apparatus a plurality of network identifiers that are unique among all nodes in the network that uses the link state routing protocol;

receiving through a second network interface of the plurality of network interfaces from a different second neighboring router a second HELLO message; and in response to receiving the second HELLO message, sending through the second network interface a second response message that includes data that indicates a different second identifier from the pool, wherein a first link state update message is provided to the second neighboring router and includes no adjacency information between the first neighboring router and the recipient node, and wherein a second link state update message is provided to the first neighboring router and includes no adjacency information between the second neighboring router and the recipient node, and wherein the first neighboring router, the second neighboring router, and the recipient node are configured to connect to a same local area network and a same domain.

12. An apparatus as recited in claim 11, wherein the second network interface is the same as the first network interface.

13. An apparatus as recited in claim 11, wherein the logic when executed is further operable for sending through the plurality of network interfaces no advertisement message that includes link state data that indicates a node with the second identifier is a neighbor of a node with the first identifier.

14. An apparatus as recited in claim 13, said sending through the plurality of network interfaces no advertisement message that includes link state data that indicates a node with the second identifier is a neighbor of a node with the first identifier further comprising sending no advertisement message that includes link state data that indicates a node with the second identifier is a neighbor of the first neighboring router.

15. An apparatus as recited in claim 13, said sending through the plurality of network interfaces no advertisement message that includes link state data that indicates a node with the second identifier is a neighbor of a node with the first identifier further comprising sending no advertisement message that includes link state data that indicates a node with the first identifier is a neighbor of the second neighboring router.

16. An apparatus as recited in claim 11, wherein the identifier pool is a plurality of Internet Protocol addresses.

17. An apparatus as recited in claim 11, wherein the identifier pool is a plurality of router identifiers configured for an Open Shortest Path First (OSPF) routing protocol.

18. An apparatus as recited in claim 11, wherein the identifier pool is a plurality of router loop-back identifiers configured for an Intermediate System to Intermediate System (IS-IS) routing protocol.

19. An apparatus as recited in claim 11, wherein the logic when executed is further operable for receiving data that indicates the identifier pool.

20. An apparatus as recited in claim 11, wherein there is no intervening intermediate network node between the apparatus and any neighboring router.

* * * * *